Aug. 17, 1965        V. F. SABOL ETAL        3,201,535
CONDUCTING STRUCTURE AND ELECTRIC SWITCH
Filed Dec. 12, 1962                         5 Sheets-Sheet 1

WITNESSES
Edwin E. Bassler
James F. Young

INVENTORS
Victor F. Sabol &
George Siviy
BY
William A. Elchik
ATTORNEY

Aug. 17, 1965    V. F. SABOL ETAL    3,201,535
CONDUCTING STRUCTURE AND ELECTRIC SWITCH
Filed Dec. 12, 1962    5 Sheets-Sheet 2
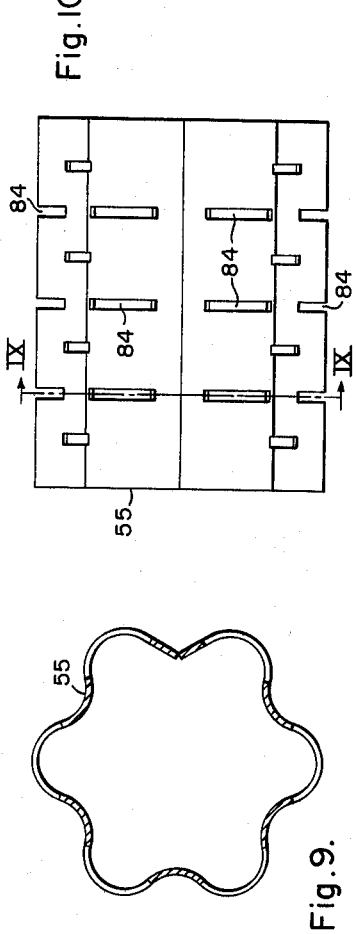
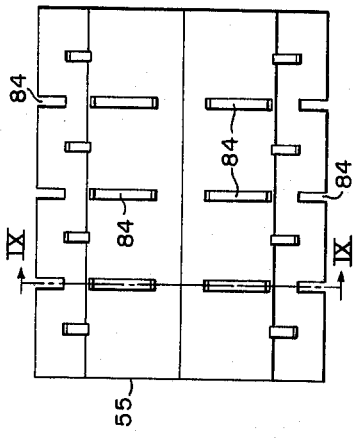
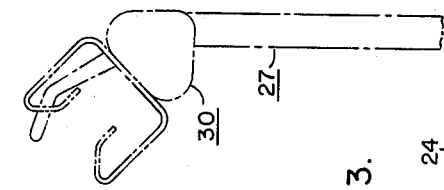
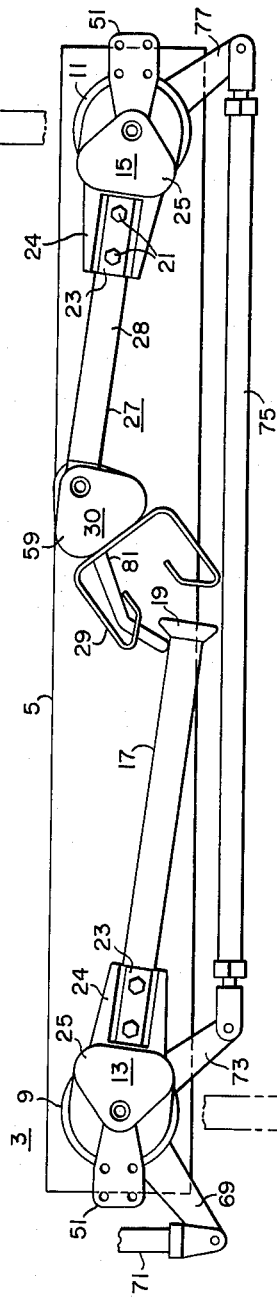
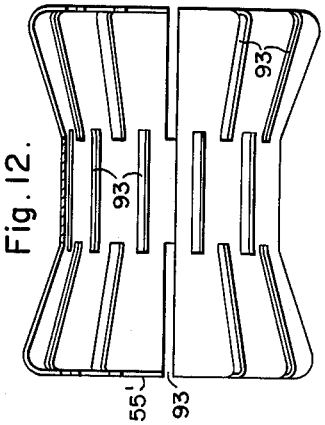
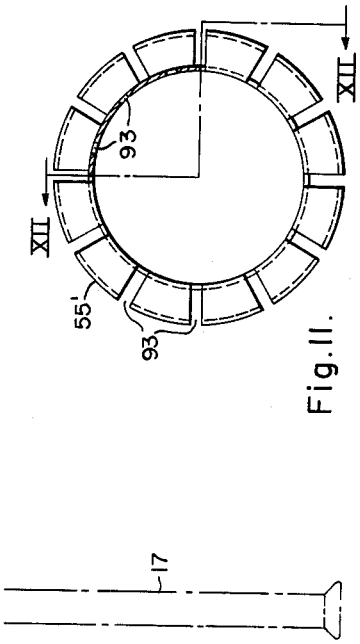

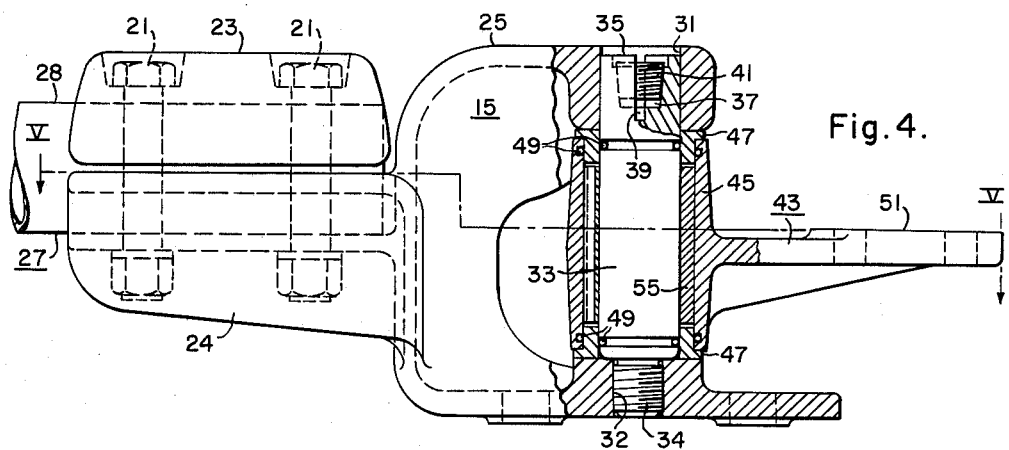

Aug. 17, 1965  V. F. SABOL ETAL  3,201,535
CONDUCTING STRUCTURE AND ELECTRIC SWITCH
Filed Dec. 12, 1962  5 Sheets-Sheet 4

United States Patent Office 3,201,535
Patented Aug. 17, 1965

3,201,535
CONDUCTING STRUCTURE AND ELECTRIC SWITCH
Victor F. Sabol and George Siviy, Monroeville, Pa., assignors to Westinghouse Electric Corporation, Pittsburgh, Pa., a corporation of Pennsylvania
Filed Dec. 12, 1962, Ser. No. 244,147
15 Claims. (Cl. 200—48)

This invention relates generally to an improved conducting structure and, more particularly, to an improved hinge-type conducting structure having particular utility in electrical control apparatus such, for example, as disconnecting switches.

A general object of this invention is to provide improved means for transmitting current between relatively movable conductors.

Another object of this invention is to provide a novel hinge-type conducting structure.

In many hinge-type conducting structures used, for example, in disconnecting switches, the current passes through relatively movable surfaces where mechanical external loads are applied, which loads tend to vary the contact pressure between the relatively movable surfaces. Moreover, in many of these hinge-type constructions, because the mechanical loads are applied through contacting and relatively movable surfaces that are in the current path, different types of construction are required for vertical, horizontal and inverted mountings where the mechanical loads are differently applied.

Accordingly, another object of this invention is to provide a novel hinge-type conducting structure wherein the primary current path does not pass through contacting and relatively movable surfaces that carry the mechanical loads.

A further object of this invention is to provide a novel hinge-type conducting structure having a simplified construction, which structure is relatively easy to assemble and reliable in operation.

Another object of this invention is to provide an improved switch structure comprising a cantilever-type contact arm supported by means of a novel hinge-type conducting structure.

A still further object of this invention is to provide an improved electric switch comprising a plurality of improved hinge-type conducting structures.

The novel features that are considered characteristic of the invention are set forth in particular in the appended claims. The invention, both as to structure and operation, together with additional objects and advantages thereof, will be best understood from the following detailed description, when read in conjunction with the accompanying drawings, in which:

FIG. 3 is a view similar to FIG. 2 showing the switch in a position just after the contacts have separated; the full open position of the contact arms being shown by a dot-and-dash line;

FIG. 4 is an enlarged view, partly in section, of one of the hinge-type conducting structures seen in FIGS. 1–3;

FIG. 5 is a sectional view taken generally along the line V—V of FIG. 4;

FIG. 8 is an enlarged sectional view of part of the hinge-type conducting structure seen in FIG. 5;

FIG. 9 is a sectional view taken generally along the line IX—IX of FIG. 10;

FIG. 10 is an enlarged elevational view of the conducting sleeve seen in FIG. 4; the conducting sleeve being rotated 90° (clockwise) from the position in which it appears in FIG. 4;

FIG. 11 is a top plan view of a conducting sleeve structure representing another embodiment of the invention;

FIG. 12 is a sectional view taken along the line XII—XII of FIG. 11;

Figure 14:
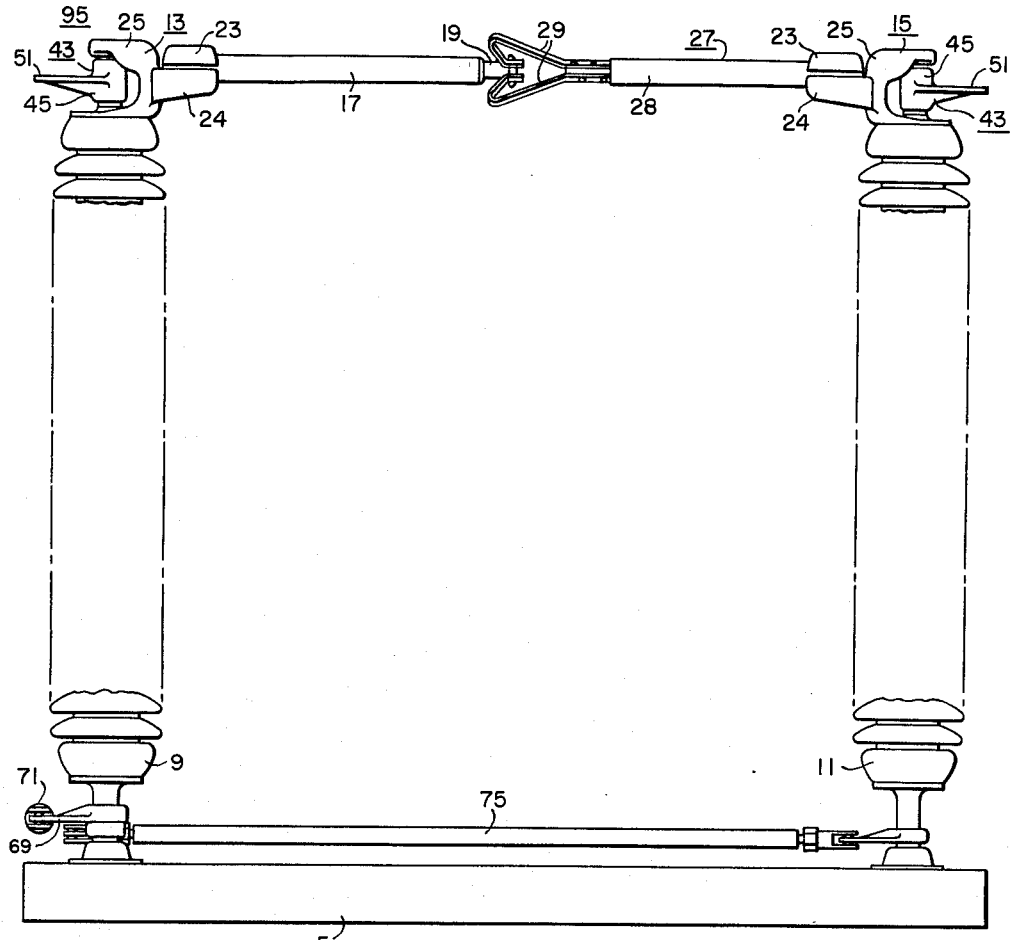
Figure 15:
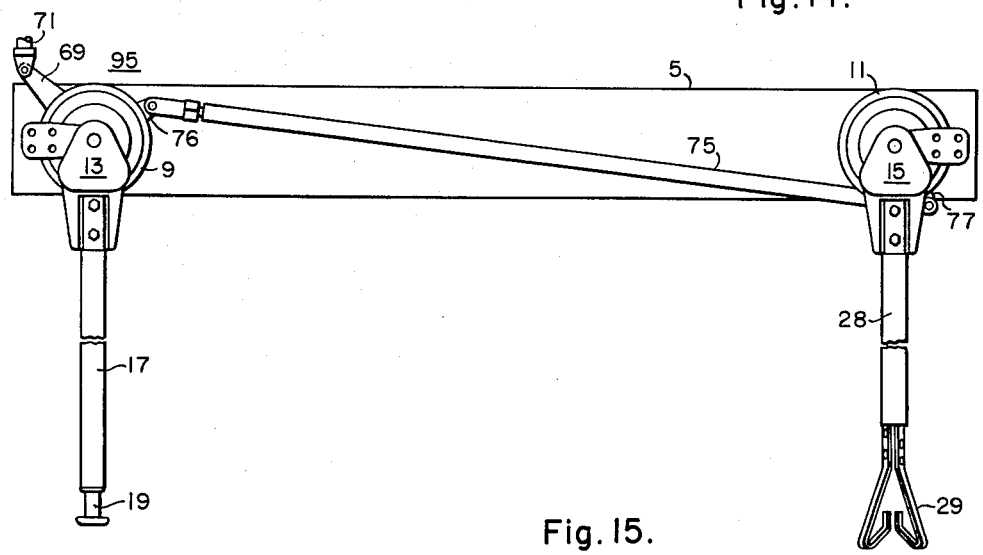

FIG. 13 is a sectional view of a hinge-type conducting structure of the type seen in FIG. 4, and comprising the conducting sleeve structure seen in FIGS. 11 and 12; and FIGS. 14 and 15 are elevational and top plan views respectively of another disconnecting switch constructed in accordance with the principles of this invention; the switch being shown in the closed position in FIG. 14 and in the open position in FIG. 15.

Figure 1:
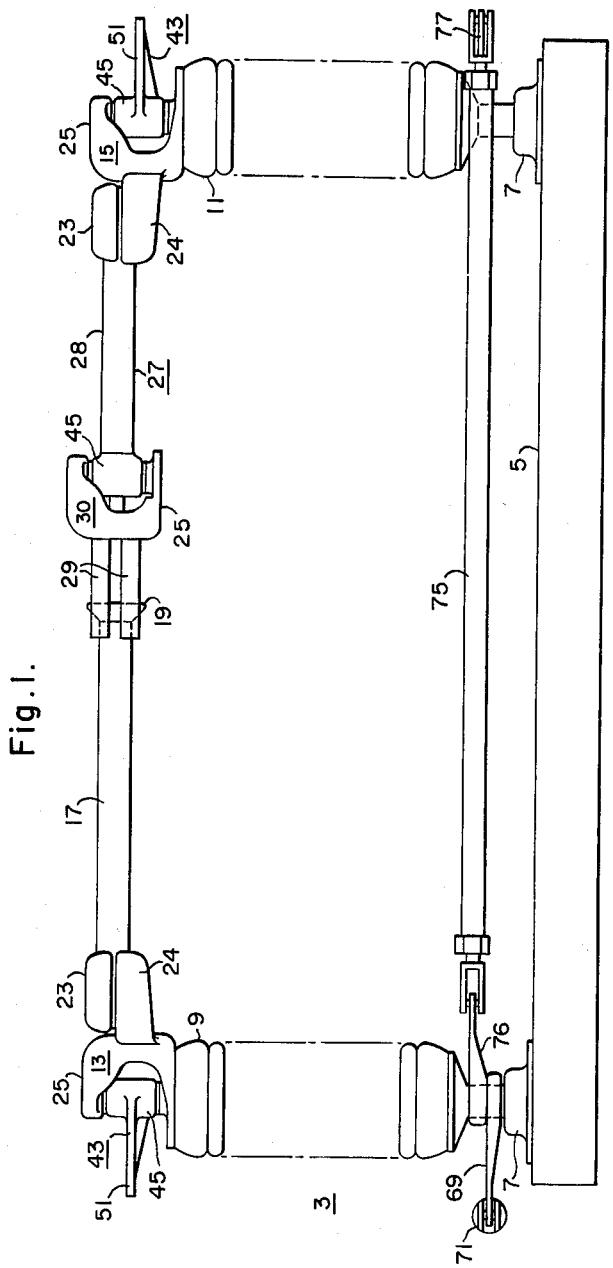
FIGURE 1 is a side elevational view of a disconnecting switch constructed in accordance with the principles of this invention.

Referring to the drawings, and particularly to FIG. 1, there is shown therein a disconnecting switch 3 comprising a base 5 and two support members 7 secured to the base 5. Two insulating supports 9 and 11 are rotatably supported on the supports 7 in a manner well known in the art. Two hinge-type conducting structures 13 and 15 are rigidly secured to the insulating supports 9 and 11, respectively. A cantilever type movable contact arm 17, having a contact 19 at the free end thereof, is secured to the hinge-type conducting structure 13 by means of two bolts 21 (FIG. 2) that fasten the contact arm 17 between an upper clamp 23 and a lower clamp 24. The lower clamp 24 is formed as an integral part of a U-shaped conducting member 25 that is rigidly secured to the insulating support 9.

A contact arm structure 27 is supported on the hinge-type conducting structure 15 by means of bolts 21 and clamp members 23, 24. Since the hinge-type conducting structures 13 and 15 are of identical construction, the reference characters for the respective parts thereof are the same, and only the conducting structure 15 will be herein specifically described.

The contact arm structure 27 comprises a contact arm 28 that is pivotally connected to a contact structure 29 by means of a hinge-type conducting structure 30. Thus, the contact arm 28 and contact structure 29 form a toggle construction that is straightened and collapsed during operation of the switch in a manner to be hereinafter specifically described.

Referring to FIG. 4, the U-shaped conducting support 25 has an opening 31 in the upper leg thereof and a tapped opening 32 in the lower leg thereof. A conducting hinge pin 33 is provided with a lower threaded extension 34 that is screwed into the tapped opening 32. The hinge pin 33 is placed in position by being passed through the opening 31 in the upper leg of the U-shaped support member 25. The upper part 35 of the hinge pin 33 is provided with a tapped opening 37 and a plurality of slots 39 that divide the upper part into a plurality of sections. A threaded plug 41 is screwed into the opening 37 to spread the plurality of sections of the upper part 35 against the side walls of the opening 31 of the upper leg of the support 25 to secure the upper part 35 of the hinge pin 33 to the support 25.

The hinge-type conducting structure 15 also comprises a conducting hinge member 43 comprising a tubular part 45 that is disposed over the hinge pin 33. The hinge member 43 is rotatably supported between the upper and lower legs of the U-shaped conducting support 25 by means of two bearings 47. Each of the bearings 47 comprises a generally ring shaped member of, for example, bronze metal that is coated with a thin coating of a resin such, for example, as polytetrafluoroethylene. A plurality of O rings 49 are provided to seal off the internal portions of the hinge-type conducting structure. The conducting hinge member 43 is provided with a terminal arm 51 to enable connection of the hinge-type conducting structure to a conducting cable or bus bar.

Referring to FIGS. 5 and 8, it will be seen that the tubular conductor 45 and the hinge-pin 33 are so constructed and arranged that an annular space 53 exists between these members. Current is carried from one to the other of these members by means of a resilient corrugated sheet-metal conducting sleeve 55 that is disposed within the annular space 53. The conducting sleeve 55 is provided with a plurality of ridges extending from one end to the other end of the sleeve 55, which ridges alternately engage the tubular conductor 45 and the hinge pin 33. As can be seen in FIG. 5, the corrugated conducting sleeve 55 is split providing two end portions that are biased apart by means of a conducting wedge member 57 that is driven between the end portions to charge the sleeve 55 so that the ridges thereof will be biased against the member 45 and 33. The conducting sleeve 55 comprises a member having high conductivity and good mechanical stiffness or spring characteristics. Tests have been conducted successfully with a conducting sleeve comprising a zirconium copper alloy of the type sold under the trade name AMZIRC and having high conductivity (96% International Annealed Copper Standard) and a high modules of elasticity ($18.7 \times 10^6$ p.s.i.).

Referring to FIGS. 4, 5 and 8, the circuit through the hinge-type conducting structure 15 passes from the contact arm 28 through the clamp portion 24 to the U-shaped conducting supports 25. The current through the top leg of the conducting support 25 passes through the top part 35 of the hinge pin 33, the hinge pin 33, the corrugated conducting sleeve 55, the tubular portion 45 of the hinge member 43, the terminal 51 to a conducting cable or bus bar that would be attached to the terminal 51. The current path through the bottom leg of the U-shaped conducting member 25 passes through the threaded extension 34 of the hinge pin 33, the hinge pin 33, the corrugated conducting sleeve 55, the tubular portion 45 of the hinge member 43, the terminal 51 to the conducting cable or bus bar that would be connected to the terminal 51. The circuit can pass through the hinge-type conducting structure in either direction.

The mechanical loads, due to the weight of the hinge 43 and the cable or bus bar that would be attached to the terminal part 51 of the hinge 43, are transmitted through the tubular conductor 45 to the lower and upper bearings 47. Part of the load through the lower bearing 47 is transmitted directly to the lower leg of the conducting support 25 and the other part is transmitted through the hinge pin 33 and the threaded extension 34 of the hinge pin 33 to the lower leg of the conducting support 25. Part of the load through the upper bearing 47 is transmitted directly to the upper leg of the conducting support 25 and the other part is transmitted through the top part 35 of the hinge pin 33 to the upper leg of the conducting support 25. It is to be noted that the mechanical loads are not transmitted through any contacting and relatively movable surfaces that are in the main current path. Thus, the contacting and relatively movable surfaces that are in the main current path are less likely to be deformed or otherwise rendered less effective because of strains or stresses that might have otherwise been applied to these surfaces.

Figure 6:
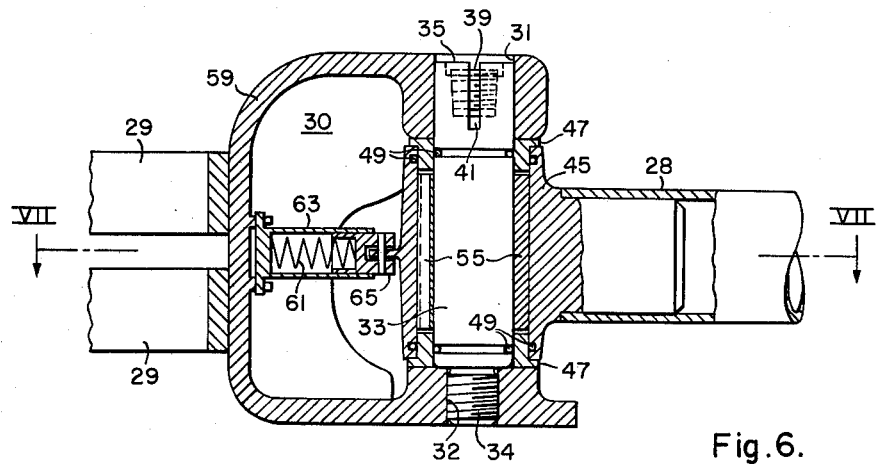
FIG. 6 is an enlarged sectional view of another of the hinge-type conducting structures seen in FIGS. 1–3.
Figure 7:
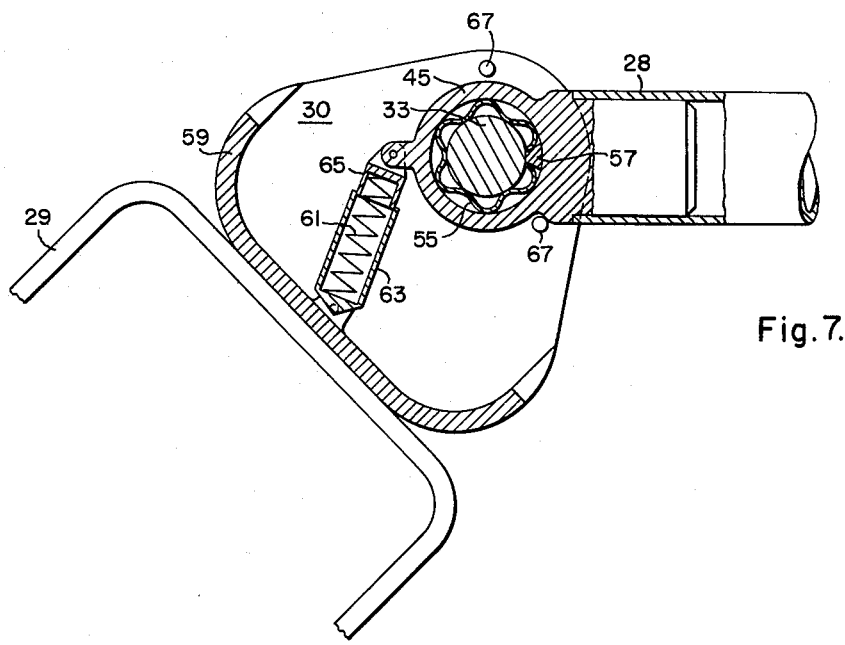
FIG. 7 is a sectional view taken generally along the line VII—VII of FIG. 6.

Referring to FIGS. 6 and 7, the hinge-type conducting structure 33 comprises a U-shaped conducting support 59 that is connected to the contact arm 28 by means of a structure similar to the hinge-type structure specifically described with reference to FIG. 4. Two resilient and conducting contact members 29 are bolted or otherwise suitably secured to the conducting support 59. An overcenter compression spring 61 is disposed at one end in a casing 63 that is pivotally connected to the conducting support 59, and at the other end in a casing 65 that is pivotally connected to the tubular conductor 45. As the toggle-type structure 28, 29 is operated between the collapsed and reset positions thereof, the casing 65 moves longitudinally within the casing 63 in a well known manner. Stops 67 are provided on the conducting support 59 to limit movement of the toggle-type structure 28, 29 at each of the two operating positions thereof.

Figure 2:
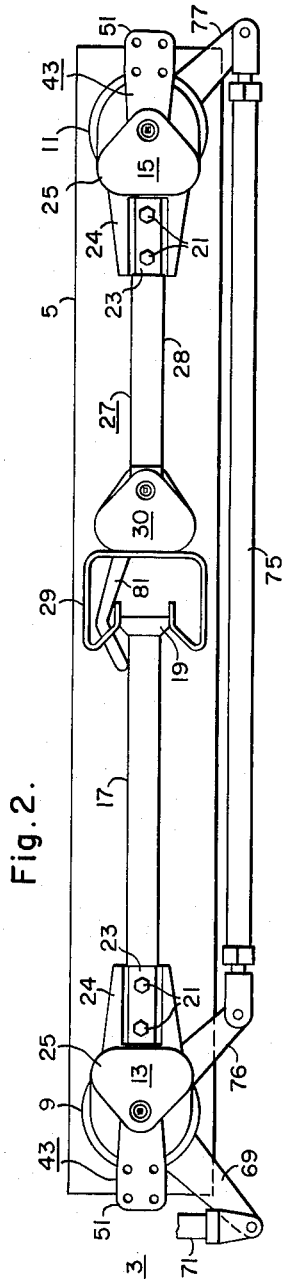
FIG. 2 is a top plan view of the switch seen in FIG. 1.

Referring to FIGS. 1 and 2, the disconnecting switch 3 is shown therein in the closed position. When it is desired to open the switch, a lever 69, which is rigidly connected to the insulating support structure 9, is rotated in a clockwise (FIG. 2) direction by means of an actuating arm 71 that is pivotally connected to the lever 69. The insulating support structure 9 is operatively connected to the insulating support structure 11 by means of a connecting rod 75. The connecting rod 75 is pivotally connected at one end thereof to a lever 76 and at the other end thereof to a lever 77. The levers 76 and 77 are rigidly secured to the insulating support structures 9 and 11, respectively. Thus, as the insulating support structure 9 is rotated in a clockwise direction to rotate the one conducting support 25 and the contact arm 17 in a clockwise direction, the insulating support structure 11 is simultaneously rotated in a clockwise direction to rotate the other conducting support 25 and the contact arm structure 28 in a clockwise direction. This movement moves the contact arm 17 and the contact arm structure 28 away from each other. During the initial part of this opening movement, the overcenter spring 61 operates to move the toggle-type structure 28, 29 to the collapsed position (FIGS. 3 and 7) with a snap action. Further movement of the actuating lever 71 continues to move the contact arm 17 and the movable contact arm structure 28 to the fully open position seen in dot-and-dash lines in FIG. 3. When it is desired to close the switch, the actuating arm 71 is moved to rotate the lever 69, and, therefore, the contact arm 17 and contact arm structure 28 in a counterclockwise direction. Near the end of this closing movement, an impact arm 81 (FIG. 3) that is attached to the U-shaped conductor 59, engages the contact arm 17 to straighten the toggle structure 28, 29 and position the contact 19 between the opposite legs of both of the spring contact 29. The disconnecting switch is shown in the fully closed position in FIGS. 1 and 2. During a closing operation, the contact arm structures move toward each other providing a mechanical advantage on impact to effectively operate the toggle structure 28, 29.

During operation of the switch, the hinge members 43, to which the conducting cables or bus bars are attached, remain stationary and the U-shaped conducting supports 25 and those parts that are attached to the conducting supports 25 move relative to the hinge members.

Referring to FIG. 10, it can be seen that there are a plurality of slots or openings 84 provided along each of the elongated ridges of the corrugated conducting sleeve 55 to thereby provide each of the elongated ridges with a plurality of contact surfaces, each of which is, to some extent, movable relative to the others. A hinge-type conducting structure like that shown in FIGS. 4 and 5, and comprising a conducting sleeve like that shown in FIGS. 4, 5 and 8–9, has been tested and found to be able to successfully withstand momentary fault currents in excess of 80,000 amperes.

The sheet-metal-type resilient conducting sleeve 55 can be constructed in a variety of forms. For example, another embodiment of the invention is seen in FIGS. 11–13 wherein a conducting sleeve 55′ is constructed with two ridges 89 (FIG. 13) adjacent its opposite ends which ridges face one direction and engage the tubular conductor 45, and a third ridge 91 intermediate the ridges 89 and facing in the opposite direction to engage the conducting hinge pin 33. A plurality of slots 93 (FIG. 12)

are provided at each of the ridges 89 and 91 in order to provide a plurality of contact surfaces each of which is movable, to some extent, relative to the other contact surfaces. A person skilled in the art will readily recognize that many other structures comprising a sheet-metal-type resilient conducting sleeve formed from a conductor having high conductivity and good spring characteristics could be constructed in accordance with the principles of this invention.

Another switch 95, embodying the improved hinge-type conducting structure, is shown in FIGS. 14 and 15. In the switch 95, the contact structure 29 is constructed with a slightly different shape and the contact arm structure 27 is constructed as a rigid member without the dog-leg or toggle construction that is embodied in the switch 3 (FIGS. 1–3). The connecting rod 75 is connected to simultaneously rotate the insulating supports 9 and 11 in opposite directions so that the contact arms 17 and 27 will move at the same side (FIG. 15) of the switch during operation. Thus, the switch 95 requires less operating space than the switch 3. The improved hinge-type conducting structures 13 and 15 function in the switch 95 in the same manner as was hereinbefore described with reference to the switch 3.

From the foregoing, it can be understood that there is provided by this invention improved means for transmitting current between relatively movable conductors. The novel hinge-type conducting structure comprises a generally tubular conductor and a hinge pin conductor disposed within the general tubular conductor in such a manner that an annular space exists between these conductors. A sheet-metal-type resilient corrugated conducting sleeve, having a plurality of different contact areas along each of the ridges thereof, is disposed within the annular space in a charged condition to transmit current from one to the other of these conductors. The mechanical loads applied to the hinge-type conducting structure are not transmitted through any contacting and relatively movable surfaces that are in the main current path. Thus, the contacting and relatively movable surfaces that are in the main current path are less likely to be deformed or otherwise rendered less effective because of strains or stresses that might have otherwise been applied to these surfaces. The novel conducting structure, therefore, has particular utility in a disconnecting switch wherein one or more cantilever-type contact arms are supported on hinge-type conducting structures to which bus bars or conducting cables are connected at the switch installation. The novel construction of the hinge-type conducting structure also provides that the improved disconnecting switch can be mounted in a vertical, horizontal or inverted position without requiring a significant change in the construction or arrangement of parts thereof. The invention also comprises a disconnecting switch comprising two cantilever-type movable contact arm structures each supported by means of one of the improved hinge-type conducting structures with one of the contact arm structures comprising two parts pivotally connected by means of one of the improved hinge-type conducting structures. Thus, an improved dog-leg or toggle-type disconnecting switch is provided wherein a mechanical advantage is gained to provide for more effective closing operations of the switch.

While the invention has been disclosed in accordance with the provisions of the patent statutes, it is to be understood that various changes in the structural details and arrangement of parts thereof may be made without departing from some of the essential features of the invention. It is desired, therefore, that the language of the appended claims be given as reasonably broad an interpretation as the prior art permits.

We claim as our invention:

1. A switch comprising a movable switch arm, a first conducting member having an opening therein, a second conducting member disposed within said opening in such a manner that a generally annular space exists between said conducting members, at least one of said conducting members being movable relative to the other during movement of said movable switch arm, a sheet-metal-type conducting sleeve comprising a member having a first ridge portion in proximity to one end thereof facing in a first direction and extending around said sleeve, a second ridge portion in proximity to the other end thereof facing in said first direction and extending around said sleeve, a third ridge portion extending around said sleeve intermediate said first and second ridge portions and facing in the opposite direction, said conductive sleeve comprising a member having good spring characteristics and being disposed within said annular space in a charged condition whereby said first and second ridge portions are biased against one of said conductors and said third ridge portion is biased against the other of said conductors, each of said ridge portions comprising a plurality of different contacting surfaces, and said conducting sleeve carrying current from one to the other of said conductors.

2. An electric switch comprising, in combination, a first conductor and a second conductor, at least one of said conductors being movable relative to the other, said conductors being constructed and arranged in such a manner that a generally annular space exists between them, a sheet-metal-type conducting sleeve being corrugated such that the ridges thereof extend from one to the other end of said sleeve, each of said ridges comprising a plurality of contact surfaces, and said conducting sleeve comprising a member having good spring characteristics and being disposed within said annular space such that a plurality of said ridges are biased against said first conductor and a plurality of said ridges are biased against said second conductor; and said conducting sleeve carrying current from one to the other of said conductors.

3. An electric switch comprising an elongated contact arm structure pivotally movable to open and close an electric circuit, a hinge-type conducting structure supporting said contact arm structure and comprising a generally U-shaped conducting support member, a tubular conductor supported between the legs of said U-shaped support member, bearing means supporting said tubular conductor between the legs of said U-shaped support member, a conducting hinge-pin disposed within said tubular conductor and connected to each of the legs of said generally U-shaped conductor, said hinge pin and said tubular conductor being disposed such that an annular space exists therebetween, and a sheet-metal-type conducting member disposed within said annular space to carry current between said conducting hinge pin and said tubular conductor.

4. An electric switch comprising, in combination, an elongated movable contact arm structure movable to open and close an electric circuit, a hinge-type conducting structure supporting said elongated contact arm structure, said hinge-type conducting structure comprising a U-shaped conducting support member rotatable to rotate said contact arm structure to open and close an electric circuit, a conducting hinge pin disposed between the legs of said U-shaped conducting member and rigidly connected to each of said legs, a bearing adjacent each of said legs of said U-shaped conducting member and disposed around said conducting hinge pin, a stationary tubular conductor disposed between said bearings and over said conducting hinge pin such that an annular space exists between said conducting hinge pin and said tubular conductor, and a sheet-metal-type conducting member comprising a member having good spring characteristics and being disposed in said annular space in a charged condition whereby a part of said sheet-metal-type member is biased against said conducting hinge pin and another part of said sheet-metal-type conducting member is biased against said tubular conductor, and said sheet-metal-type conducting member conducting current between said conducting hinge pin and said tubular conductor.

5. An electric switch comprising an elongated contact arm structure movable to open and close an electric circuit, a hinge-type conducting structure supporting said contact arm structure for pivotal movement, said hinge-type support structure comprising a generally U-shaped conducting support, a conducting hinge pin disposed between and connected to the legs of said U-shaped support member, a tubular conductor disposed over said conducting hinge pin and supported between the legs of said U-shaped support member, a bearing at each of the opposite ends of said tubular conductor disposed between the associated end of said tubular conductor and the associated leg of said U-shaped support, a sheet-metal-type conducting sleeve formed with a plurality of ridges and comprising a material having high conductivity and good spring characteristics, said conducting sleeve being disposed between said conducting hinge pin and said tubular conductor in a charged condition whereby a plurality of ridges thereof are biased against said conducting hinge pin and a plurality of ridges thereof are biased against said tubular conductor, and said conducting sleeve carrying current between said conducting hinge pin and said tubular conductor.

6. An electric switch comprising, in combination, an elongated movable contact arm structure, a hinge-type conducting structure supporting said elongated movable contact arm structure and comprising a generally U-shaped conducting support member fixedly secured to said movable contact arm structure, a conducting hinge pin disposed between and fixedly connected to the legs of said generally U-shaped support member, a tubular conductor disposed over said hinge pin and supported between the legs of said generally U-shaped support member, bearing means disposed between said tubular conductor and the legs of said generally U-shaped support member, said conducting hinge pin and said tubular conductor being so constructed and arranged that an annular space exists therebetween, a reslient sheet-metal-type corrugated conducting sleeve having a plurality of ridges on the outside thereof and a plurality of ridges on the inside thereof, each of said ridges extending from one to the other end of said conducting sleeve, said corrugated conducting sleeve comprising a resilient member and being disposed within said annular space in a charged condition whereby a plurality of the ridges on the outside thereof are biased against said tubular conductor and a plurality of the ridges on the inside thereof are biased against said conducting hinge pin, said corrugated conducting sleeve transmitting current between said tubular conductor and said conducting hinge pin and said movable contact arm structure, said U-shaped conducting support member and said conducting hinge pin all being rotatable as a unit relative to said tubular conductor to open and close an electric circuit.

7. A switch structure comprising, in combination, a first cantilever-type contact arm comprising an elongated contact arm having a first contact at one end thereof, a first hinge-type conducting structure pivotally supporting the other end of said first contact arm, a second cantilever-type contact arm having a second contact at one end thereof, a second hinge-type conducting structure pivotally supporting the other end of said second contact arm, said second contact arm comprising two parts and a third hinge-type conducting structure pivotally connecting said two parts, said second contact arm comprising overcenter spring means operable during opening and closing operations of said switch to collapse and straighten said two parts, when said switch is in the closed position said two parts being relatively straight and said contact arms engaging in a generally end-to-end relationship, means operable to simultaneously rotate said contact arms in the same direction during which rotation said overcenter spring means is operated to collapse said parts and said contacts are separated, each of said first, second and third hinge-type conducting structures comprising a generally U-shaped conducting support, a conducting hinge pin disposed between and connected to the legs of each of said U-shaped conducting supports, a tubular conductor disposed over each conducting hinge pin and between the legs of the associated U-shaped conducting support, bearing means disposed between each tubular support and the legs of the associated U-shaped conducting support, each conducting hinge pin and associated tubular conductor being constructed and arranged such that an annular space exists therebetween, and a resilient sheet-metal-type conducting member disposed within each of said spaces in a charged condition to transmit current between the associated conducting hinge pin and the associated tubular conductor.

8. A switch structure comprising, in combination, a first cantilever-type contact arm comprising an elongated rigid contact arm having a first contact at one end thereof, a first hinge-type conducting structure pivotally supporting the other end of said first contact arm, a second contact arm having a second contact at one end thereof, a second hinge-type conducting structure pivotally supporting the other end of said second contact arm, said second contact arm comprising two parts and a third hinge-type conducting structure pivotally connecting said two parts, when said switch is in the closed position said two parts being relatively straight and said contact arms engaging in a generally end-to-end relationship, means operable to simultaneously rotate said contact arms in the same direction during which rotation said two parts are collapsed and said contacts are separated, each of said first, second and third hinge-type conducting structures comprising a generally U-shaped conducting support, a conducting hinge pin disposed between and connected to the legs of each of said U-shaped conducting supports, a tubular conductor disposed over each conducting hinge pin and between the legs of the associated U-shaped conducting support, bearing means disposed between each tubular support and the legs of the associated U-shaped conducting support, each conducting hinge pin and associated tubular conductor being constructed and arranged such that an annular space exists therebetween, and a sheet-metal-type resilient corrugated conducting sleeve disposed within each annular space in a charged condition to transmit current between the associated conducting hinge pin and the associated tubular conductor.

9. In combination, a tubular conductor, a second conductor disposed within said tubular conductor, at least one of said conductors being movable relative to the other, a resilient sheet-metal type conducting sleeve disposed over said second conductor and within said tubular conductor to carry current from one to the other of said conductors, and the resilience of said conducting sleeve serving to bias said conducting sleeve against said second conductor and against the internal surface of said tubular conductor.

10. In combination, a tubular conductor having an internal surface, a second conductor having an external surface and being disposed within said tubular conductor in such a manner that a generally annular space exists between said internal and external surfaces, at least one of said conductors being rotatable relative to the other, a spring-type conducting sleeve structure comprising a conducting sleeve having a thickness less than the thickness of said space such that points on exact opposite sides of said sleeve do not engage both of said conductors, said spring-type conducting sleeve structure being disposed in said space in a charged condition and being shaped such that a plurality of different surface areas thereof are biased against said internal surface of said tubular conductor and a plurality of different surface areas thereof are biased against said external surface of said second conductor whereby said spring-type conducting sleeve structure carries current from one to the other of said conductors.

11. In combination, a first conductor and a second conductor, said first conductor comprising a tubular conductor having an internal cylindrical surface, said second conductor comprising a conducting member having an external surface in the form of a cylinder, said second conductor being disposed concentrically within said first conductor, the radius of said internal cylindrical surface being greater than the radius of said external cylindrical surface whereby a generally annular space exists between said internal and external cylindrical surfaces, at least one of said conductors being rotatable axially relative to the other, a sheet-metal type resilient conducting sleeve disposed in said space between said cylindrical surfaces, said conducting sleeve having a thickness less than the thickness of said space such that points on the exact opposite sides of said conducting sleeve do not engage both of said cylindrical surfaces, said conducting sleeve being disposed in said space in a charged condition and being shaped such that a plurality of different surface areas thereof are biased against said internal cylindrical surface and a plurality of different surface areas thereof are biased against said external cylindrical surface whereby said conducting sleeve carries current from one to the other of said first and second conductors.

12. An electric switch comprising a contact arm, a hinge-type conducting structure rotatably supporting said contact arm and comprising a first conductor generally tubular in shape, a second conductor disposed within said first conductor in such a manner that a generally annular space exists being said conductors, at least one of said conductors being rotatable to rotate said contact arm to open and close an electric circuit, a conducting member disposed within said annular space, said conducting member being thinner than said annular space whereby when a first surface area thereof engages one of said conductors the surface area on the exact opposite side of said first surface area is spaced from the other of said conductors, said conducting member being constructed such that a plurality of different surface areas thereof engage said first conductor and a plurality of different surface areas thereof engage said second conductor whereby said conducting member carries current from one to the other of said conductors.

13. A switch comprising a contact arm, a tubular conductor, a second conductor disposed within said tubular conductor, at least one of said conductors being movable relative to the other to move said contact arm, a resilient sheet-metal type conducting sleeve disposed over said second conductor and within said tubular conductor to carry current from one to the other of said conductors, and the resilience of said conducting sleeve serving to bias said conducting sleeve against said second conductor and against the internal surface of said tubular conductor.

14. A switch comprising a contact arm movable between opened and closed positions, a tubular conductor having an internal surface, a second conductor having an external surface and being disposed within said tubular conductor in such a manner that a generally annular space exists between said internal and external surfaces, one of said conductors being movable relative to the other during movement of said contact arm, a spring-type conducting sleeve structure comprising a conducting sleeve having a thickness less than the thickness of said space such that points on exact opposite sides of said sleeve do not engage both of said conductors, said spring-type conducting sleeve structure being disposed around said second conductor in said space in a charged condition and being shaped such that a plurality of different surface areas on the outside thereof are biased against said internal surface of said tubular conductor and a plurality of different surface areas on the inside thereof are biased against said external surface of said second conductor whereby said spring-type conducting sleeve structure carries current from one to the other of said conductors.

15. A switch comprising a contact arm movable to open and close an electric circuit, a first conductor and a second conductor, one of said first and second conductors being movable relative to the other during said relative movement of said contact arm, said first conductor comprising a tubular conductor having an internal cylindrical surface, said second conductor comprising a conducting member having an external surface in the form of a cylinder, said second conductor being disposed concentrically within said first conductor, the radius of said internal cylindrical surface being greater than the radius of said external cylindrical surface whereby an annular space exists between said internal and external cylindrical surfaces, and a resilient sheet-metal type conducting sleeve member shaped to normally occupy an annular space having a greater radial dimension than said annular space and being disposed within said annular space in a charged condition whereby the resilience of said resilient sheet-metal type conducting sleeve biases said conducting sleeve against said internal and external cylindrical surfaces, and said conducting sleeve carrying current from one to the other of said first and second conductors.

References Cited by the Examiner
UNITED STATES PATENTS

| | | | |
|---|---|---|---|
| 2,193,122 | 3/40 | Crabbs | 200—170 X |
| 2,473,705 | 6/49 | George | 339—5 |
| 2,780,684 | 2/57 | Brown et al. | 200—48 |
| 3,012,123 | 12/61 | Richardson et al. | 200—48 |
| 3,058,082 | 10/62 | Messerli | 339—8 |

BERNARD A. GILHEANY, *Primary Examiner.*
ROBERT K. SCHAEFER, *Examiner.*